July 3, 1928.
H. P. THOMPSON
1,675,519
SPOTLIGHT AND MOUNTING THEREFOR
Filed March 10, 1924
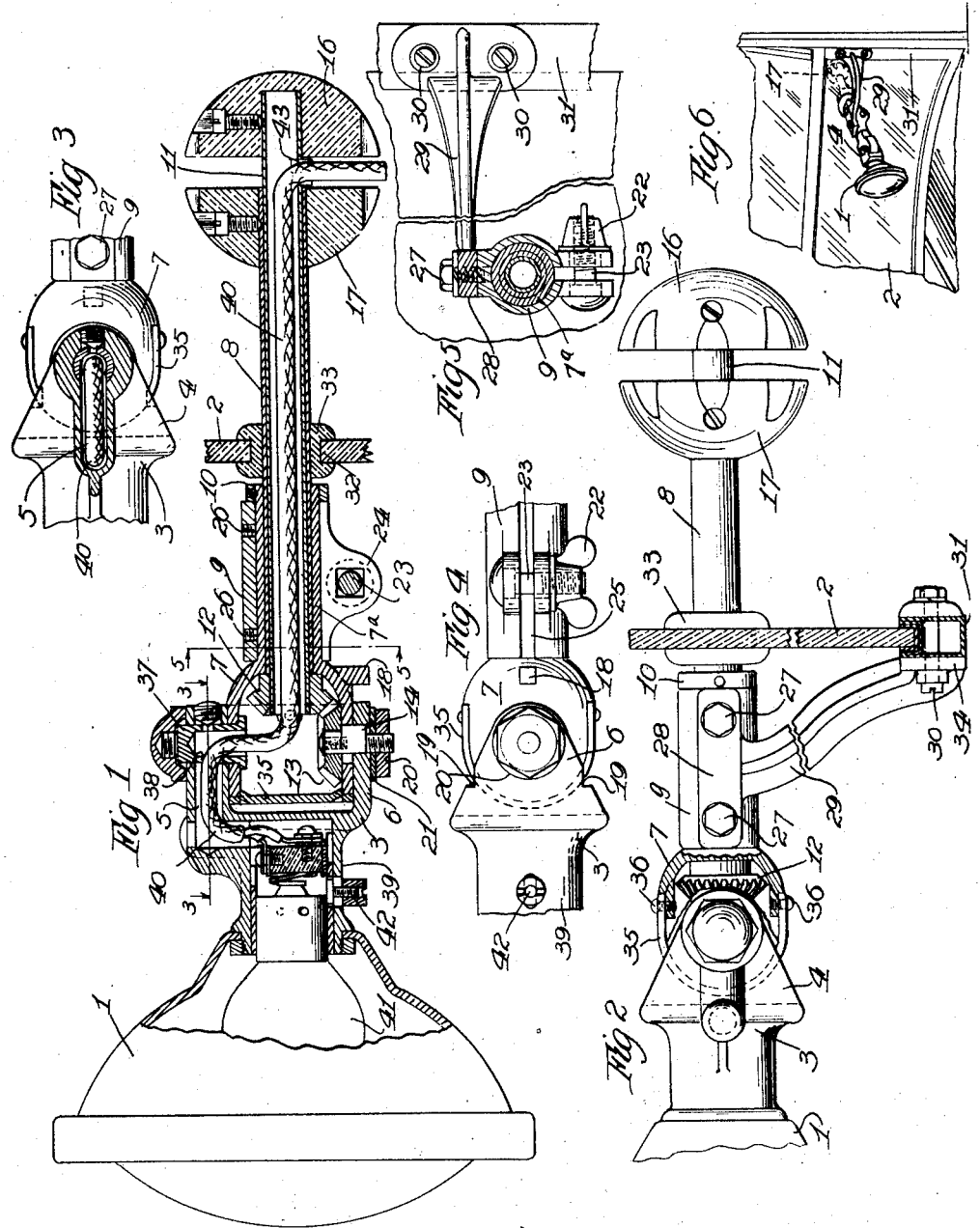
Witness
J. D. McKnight.
Inventor.
Henry P. Thompson
by Burton & Burton
his Attorneys.

Patented July 3, 1928.

1,675,519

UNITED STATES PATENT OFFICE.

HENRY P. THOMPSON, OF CHICAGO, ILLINOIS.

SPOTLIGHT AND MOUNTING THEREFOR.

Application filed March 10, 1924. Serial No. 698,017.

The purpose of this invention is to provide an improved construction of spotlight and means for mounting it on a motor vehicle in convenient position for manipulation and adjustment by the driver as for example at some point in the area of the windshield but without requiring a large hole to be cut in the glass of the windshield and without placing any strain upon said glass for supporting the spotlight. The invention consists in certain features and elements of construction in combination as herein shown and described and as indicated by the claims.

In the drawings:—

Figure 1 is principally a medial vertical section of a spotlight and adjusting means embodying this invention.

Figure 2 is a top plan view partly in section showing also the means for supporting the spotlight upon a member beyond the area of the windshield glass.

Figure 3 is a detail plan view partly in section as indicated at line 3—3 on Figure 1.

Figure 4 is a detail bottom view of the yoke connection between the lamp body and the adjusting member, showing also a part of the supporting bracket clamp.

Figure 5 is a transverse vertical section taken as indicated at line 5—5 on Figure 1.

Figure 6 is a perspective view showing the lamp mounted in position of use on a vehicle windshield.

Figure 7 is a perspective view of a stud for one of the operating gears.

A popular position for an adjustable light projector in the nature of a searchlight or spotlight on a motor vehicle is the area of the windshield because it places the lamp in a position straight ahead with the driver such that he can instinctively point the beam of light as he would aim a pistol. Such mounting is usually accomplished by cutting a rather large hole in the glass of the windshield and clamping therein a support. The lamp body is provided with a rearwardly extending stem or handle passing through such support and universally adjustable therein at least within a limited range so that the inner end of the stem being substantially rigid with the lamp body is moved angularly by the driver in alignment with the beam of light projected by the lamp for adjusting the latter. Such an arrangement, however, tends to materially weaken the glass of the windshield on account of the necessary size of the opening and if the supporting fixture is too tightly clamped to the glass around the opening it may cause the latter to crack in severely cold or severely hot weather by interfering with the normal expansion or contraction of the glass. Furthermore since the lamp body is usually rigid with the stem the angular range of adjustment is quite limited when the axes of such adjustment are planned to lie in the plane of the windshield glass. Usually the light cannot be directed laterally at more than 45° from the direction of travel whereas it is often desirable to swing the light through 90° for reading house numbers or signs at the side of the road.

The foregoing disadvantages are overcome in the construction shown in the drawings in which the lamp casing is indicated at 1 and a fragment of the windshield is shown at 2. Centrally secured to the rear side of the casing I provide a yoke 3, whose upper arm, 4, is formed with a hollow passage, 5, for the lead wires of the lamp while the lower arm, 6, extends opposite the upper arm and co-operates with it to embrace a gear housing, 7, mounted at the forward end of a sleeve, 8, which extends through a small aperture in the windshield, 2. The housing, 7, is itself in the form of a yoke whose upper and lower arms are fitted between the arms of the yoke, 3, and pivotally connected to them. The yoke, 7, is formed with a sleeve, 7ª, secured fast to the hollow stem, 8, but mounted to rotate within the split sleeve, 9, by which the assembly is supported. The yoke, 7, abuts said sleeve, 9, at one end and a retaining collar, 10, forms a flange which engages the other end. Within the hollow stem, 8, is journaled a hollow shaft, 11, carrying at its forward end a bevel gear, 12, which meshes with a bevel gear, 13, journaled in the lower arm of the yoke, 7, upon a stud, 14, formed as shown in Figure 7 with a flat face, 14ª, at one side for operative engagement with the gear, 13, and with the correspondingly shaped hole in the lower yoke arm, 6. The hole in the housing, 7, is circular permitting the stud, 14, to rotate therein but when the gear, 12, is operated by the hollow shaft, 11, to turn the gear, 13, it will be seen that the yoke, 3, will move with said gear, 13, about the vertical pivot axis which connects said yoke with the housing, 7, and thus the lamp casing, 1, will be swung to the right or the left according to the direction of rotation of the shaft, 11. A knob, 16, is provided for thus manipulating said shaft.

A second knob, 17, is secured to the inner end of the hollow stem, 8. Rotation of said knob, 17, turns the stem, 8, within the bracket, 9, thus rotating the housing, 7, about the axis of the stem, 8, and rotating with it the lamp casing, 1, whether the latter happens to be swung at an angle to the stem, 8, or stands in alignment therewith as shown in the drawings. Obviously, if the lamp casing be exactly in alignment with the stem, 8, the rotation of the latter will not alter the position of the light beam but if said beam is already disposed at an angle to the axis of the stem, 8, the rotation of the latter will swing the beam of light through a conical path and the shape of the cone thus described will depend upon the angle between the light beam and the stem, 8. This arrangement gives a range of adjustment allowing the light beam to be projected in any direction forward of a vertical plane through the axis of the pivot stud, 14. It permits the light to be swung at right angles to the axis of the stem, 8, and the range is thus limited merely by reason of the fact that mounted as near the windshield, 2, as shown the lamp casing, 1, will closely approach the plane of the windshield when adjusted at 90° from its straight ahead position. To prevent the lamp from actually striking the glass, 2, a stop lug, 18, may be formed on the lower side of the housing, 7, to be engaged by one or the other of the notches, 19, in the edge of the yoke arm, 6.

For retaining the parts in any position of adjustment I provide a clamping nut, 20, on the lower threaded end of the stud, 14, with a yielding washer, 21, interposed between the nut and the lower face of the yoke arm, 6. This produces an adjustable friction between the back of the gear, 13, and the inner side of the housing, 7, against which it rotates. The frictional hold of the bracket sleeve, 9, upon the hollow stem, 8, may be varied by means of an adjusting wing nut, 22, on the clamping bolt, 23, which extends through the lugs, 24, depending from the sleeve, 9, at the opposite sides of its longitudinal rift, 25.

The upper side of the sleeve, 9, is formed with a flat face having two threaded holes, 26, to receive screws, 27, for attachment of the mounting bracket, 28. The bracket arm, 29, extends laterally for attachment by any suitable means such as clamping bolts, 30, to the metallic frame, 31, which carries the windshield glass, 2. This transfers the entire weight of the lamp casing, 1, and the adjusting mechanism to the frame, 31, and requires only a relatively small aperture to be formed in the windshield, 2, at 32 to accommodate the stem, 8. Preferably a flanged rubber washer or gasket, 33, is inserted in the opening, 32, to provide a yielding closure for the clearance space around the stem, 8, and to exclude dust and moisture at this point.

By inverting the flat end of the bracket, 28, upon the flat upper surface of the sleeve, 9, the arm, 29, may be arranged to extend to the opposite side of the assembly for mounting the lamp at the other side of the windshield; or by rotating the bracket sleeve, 9, through 90° upon the stem, 8, its mounting foot, 34, may be swung in position for attachment to the lower member of the windshield frame or to the upper cross member if desired. Thus the lamp may be positioned at practically any desired point in the area of the windshield with its weight supported independently of the glass at any such position.

The yoke-like casing, 7, is completely enclosed by a curved plate, 35, secured by screws, 36, and the upper pivot, 37, is axially hollowed and laterally apertured at 38 to connect with the passage, 5, in the upper yoke arm, 4, for accommodating the lead wires, 40. These wires are connected in the neck, 39, of the yoke, 3, to any suitable form of terminals for making contact with the corresponding parts of the lamp, 41. Preferably a focusing screw, 42, is also provided for adjusting the lamp with respect to the reflector of the casing, 1. From the chamber formed in the casing, 7, the lead wires, 40, extend back through the hollow shaft, 11, and emerge therefrom at a lateral aperture, 43, positioned between the knobs, 16 and 17. This allows the wires, 40, to depend at the rear of the windshield, 2, for connection to the source of current which is usually available at the instrument board of the vehicle. Since the gears, 12 and 13, are of equal size and the range of the lamp about the axis of the gear, 13, is limited to substantially 180° the knob, 16, and its hollow shaft, 11, will be limited to the same angle except as they may turn bodily upon rotation of the knob, 17, and the hollow stem, 8. In any event the opening, 43, will not be rotated through more than a complete turn and the wires emerging therethrough will merely wind and unwind slightly upon the part of the shaft, 11, exposed between the two knobs.

I claim:—

1. In combination, a lamp body, a rearwardly opening yoke extending therefrom, a housing upon which the arms of said yoke are lapped and pivoted, a hollow adjusting member rotatable in said housing and extending rearwardly therefrom with gearing in the housing operatively connecting said member with the yoke, one arm of the yoke being hollow and the pivotal connection of said arm having a passage by which the hollow arm communicates with the housing and a continuous lead wire extending through said hollow yoke arm and its pivotal connection and through the hollow adjusting member for supplying electrical energy to the lamp.

2. In the combination defined in claim 1, said hollow member terminating in a knob, a second adjusting member sleeved upon the first and terminating in a knob spaced forwardly from that of the first, said first member having a lateral opening at a point between said knobs and the lead wire emerging through said opening.

3. In combination, a lamp body, a rearwardly opening yoke extending from the back of said body, a hollow adjusting member provided with a forwardly opening yoke whose arms lap those of the yoke on the lamp and are pivotally connected thereto, means supporting said member for rotation about its own axis, a second adjusting member extending longitudinally through the first and operatively engaged with means located in the yoke of the first member for controlling relative adjustment of the yokes about their pivotal connection.

In testimony whereof I have hereunto set my hand at Chicago, Illinois, this 3rd day of March, 1924.

HENRY P. THOMPSON.